(12) United States Patent
Shih et al.

(10) Patent No.: US 12,422,699 B2
(45) Date of Patent: Sep. 23, 2025

(54) OPTICAL MODULATOR AND METHOD OF FORMING THE SAME

(71) Applicant: TAIWAN SEMICONDUCTOR MANUFACTURING COMPANY LTD., Hsinchu (TW)

(72) Inventors: Chih-Tsung Shih, Hsinchu (TW); Feng Yuan, Hsinchu (TW); Wei-Kang Liu, Taichung (TW); Yingkit Felix Tsui, Cupertino, CA (US)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 179 days.

(21) Appl. No.: 17/816,764

(22) Filed: Aug. 2, 2022

(65) Prior Publication Data
US 2024/0045240 A1  Feb. 8, 2024

(51) Int. Cl.
*G02B 6/12* (2006.01)
*G02F 1/025* (2006.01)

(52) U.S. Cl.
CPC ......... *G02F 1/025* (2013.01); *G02B 6/12004* (2013.01); *G02B 2006/12061* (2013.01); *G02B 2006/12123* (2013.01); *G02B 2006/12142* (2013.01)

(58) Field of Classification Search
CPC ....................................................... G02B 6/12
USPC .......................................................... 385/2
See application file for complete search history.

(56) References Cited

U.S. PATENT DOCUMENTS

| | | | | |
|---|---|---|---|---|
| 6,298,177 B1* | 10/2001 | House | ..................... | G02F 1/025 |
| | | | | 385/3 |
| 8,588,570 B2* | 11/2013 | Rong | ..................... | H01L 22/34 |
| | | | | 385/132 |
| 9,093,820 B1* | 7/2015 | Raring | .................. | H01S 5/0206 |
| 9,666,677 B1* | 5/2017 | Raring | .................. | H01L 29/402 |
| 10,444,593 B2* | 10/2019 | Mekis | ........................ | G02F 1/21 |
| 11,611,397 B1* | 3/2023 | Byun | ........................ | H01S 5/50 |
| 2003/0123829 A1* | 7/2003 | Taylor | ................. | H01S 5/18308 |
| | | | | 257/E29.25 |
| 2006/0008223 A1* | 1/2006 | Gunn | ..................... | G02F 1/025 |
| | | | | 385/129 |
| 2007/0152225 A1* | 7/2007 | Ooi | ..................... | H01L 33/0045 |
| | | | | 257/E33.054 |

(Continued)

*Primary Examiner* — Kaveh C Kianni
(74) *Attorney, Agent, or Firm* — WPAT Law; Anthony King

(57) ABSTRACT

A method includes receiving a silicon substrate; forming a first doped region and a second doped region in the silicon substrate; forming a third doped region and fourth doped region on upper portions of the first doped region and the second doped region, respectively; and patterning the silicon substrate to form an optical modulator. The optical modulator includes: a first section; a second section and a third section at least formed from the first and second doped regions, respectively; a fourth section, including a first height less than that of the first section and the second section and arranged between the first section and the second section, the fourth section being an undoped region; and a fifth section immediately adjacent to the fourth section, the fifth section including a height less than that of the first section and the second section and different from the first height.

20 Claims, 19 Drawing Sheets

(56) References Cited

U.S. PATENT DOCUMENTS

| | | | | |
|---|---|---|---|---|
| 2012/0033910 A1* | 2/2012 | Morini | G02F 1/025 | |
| | | | 438/106 | |
| 2013/0064491 A1* | 3/2013 | Fujikata | G02F 1/035 | |
| | | | 438/31 | |
| 2014/0127842 A1* | 5/2014 | Song | H01P 11/001 | |
| | | | 438/31 | |
| 2014/0233878 A1* | 8/2014 | Goi | G02B 6/122 | |
| | | | 385/14 | |
| 2014/0286647 A1* | 9/2014 | Ayazi | G02F 1/2257 | |
| | | | 398/139 | |
| 2014/0355925 A1* | 12/2014 | Manouvrier | G02B 6/12 | |
| | | | 438/31 | |
| 2015/0316793 A1* | 11/2015 | Ayazi | G02F 1/025 | |
| | | | 438/31 | |
| 2015/0381283 A1* | 12/2015 | Sahni | G02F 1/025 | |
| | | | 398/188 | |
| 2016/0004104 A1* | 1/2016 | Feng | G02F 1/2257 | |
| | | | 385/3 | |
| 2017/0040487 A1* | 2/2017 | Alloatti | H01L 31/03529 | |
| 2017/0299902 A1* | 10/2017 | Yu | G02B 6/131 | |
| 2018/0217469 A1* | 8/2018 | Yu | G02F 1/2257 | |
| 2019/0179177 A1* | 6/2019 | Rickman | G02F 1/025 | |
| 2019/0219846 A1* | 7/2019 | Van Campenhout | G02F 1/01708 | |
| 2019/0293971 A1* | 9/2019 | Yu | G02F 1/017 | |
| 2020/0124878 A1* | 4/2020 | Yu | G02F 1/225 | |
| 2021/0066529 A1* | 3/2021 | Lu | H01L 31/1075 | |
| 2021/0391370 A1* | 12/2021 | Lu | H01L 27/14627 | |
| 2022/0187635 A1* | 6/2022 | Karimelahi | G02F 1/025 | |
| 2022/0262974 A1* | 8/2022 | Lu | G01S 7/4814 | |
| 2022/0344476 A1* | 10/2022 | Chan | H01S 5/0216 | |
| 2023/0251419 A1* | 8/2023 | Zilkie | G02B 6/136 | |
| | | | 385/14 | |
| 2023/0343632 A1* | 10/2023 | Or-Bach | H10B 12/20 | |

* cited by examiner

OPTICAL MODULATOR AND METHOD OF FORMING THE SAME

BACKGROUND

Modern technology advances, such as big data, cloud computation, cloud storage, and Internet of Things (IoT), have driven exponential growth of various applications in processing and communications of data, e.g., high performance computers, data centers, and long-haul telecommunication. To address the emerging need of high data rate transmission, a modern semiconductor structure may include optical elements for providing optical data links to improve the data transmission rate of existing electrical data links. In the development of incorporating optical data links to the semiconductor device, the challenge of low thermal-induced noise has attracted a great deal of attention.

BRIEF DESCRIPTION OF THE DRAWINGS

Aspects of the embodiments of the present disclosure are best understood from the following detailed description when read with the accompanying figures. It is noted that, in accordance with the standard practice in the industry, various structures are not drawn to scale. In fact, the dimensions of the various structures may be arbitrarily increased or reduced for clarity of discussion.

DETAILED DESCRIPTION

Figure 1:
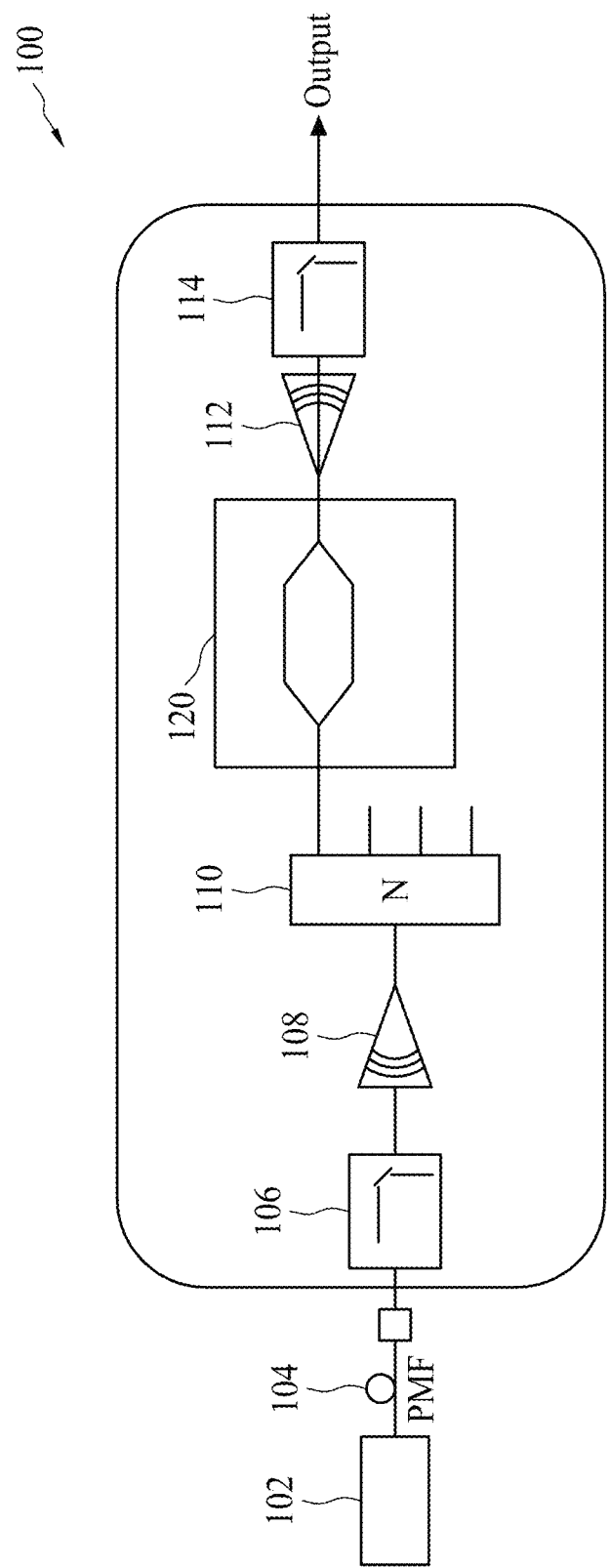
FIG. 1 is a block diagram of a photonic system, in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "over," "upper," "on," and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, although the terms such as "first," "second" and "third" describe various elements, components, regions, layers and/or sections, these elements, components, regions, layers and/or sections should not be limited by these terms. These terms may be only used to distinguish one element, component, region, layer or section from another. The terms such as "first," "second" and "third" when used herein do not imply a sequence or order unless clearly indicated by the context.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the deviation normally found in the respective testing measurements. Also, as used herein, the terms "about," "substantial" or "substantially" generally mean within 10%, 5%, 1% or 0.5% of a given value or range. Alternatively, the terms "about," "substantial" or "substantially" mean within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the terms "about," "substantial" or "substantially." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as being from one endpoint to another endpoint or between two endpoints. All ranges disclosed herein are inclusive of the endpoints, unless specified otherwise.

Embodiments of the present disclosure an optical modulator and a method of forming an optical modulator. Specifically, the optical modulator is an optical phase modulator. Modern optical waveguides and optical modulators may be implemented with a silicon-based material due to its low transmission loss and compatibility with existing semiconductor fabrication processes. An electrode pair is formed with silicon on two-sides of the waveguide and incorporated into the silicon-based optical modulator. A modulating current is provided from one of the electrodes through the silicon-based optical phase modulator and reaches the other one of the electrode pair. A larger current would provide better phase modulation performance while increasing more heat to the waveguide. The higher working temperature will offset the modulated phase of the optical signal. As a result, the modulation performance may be a tradeoff between the current magnitude and heat generated by the current.

The present disclosure proposes a two-level electrode design or a two-level optical waveguide structure to effectively reducing the electrical resistance of the optical phase modulator. As a result, the current level is increased to facilitate phase modulation performance while the heat accumulation does not increase proportionally. The function of the optical modulator can be improved.

FIG. 1 is a block diagram of a photonic system 10, in accordance with some embodiments of the present disclosure. In some embodiments, the photonic system 10 is part of an optical link used to transmit high-speed data with a modulated light beam. In some embodiments, the photonic system 10 is configured to transmit an electrically modulated optical signal between two or more electrical devices. In some embodiments, the photonic system 10 is incorporated into a semiconductor package and configured to convert electrical signals to optical signals, and vice versa, between interconnected electrical devices.

The photonic system 10 may include an optical source 102, an optical fiber 104 and a photonic device 100. In some embodiments, the optical source 102 is configured to generate a light beam, e.g., at a wavelength of 850 nm, 1310 nm or 1550 nm. The optical source 102 may be a laser diode or a light-emitting diode. In some embodiments, the optical fiber 104 is configured to transmit the light beam to the photonic device 100. The optical fiber 104 may include a core component (not separately shown), in which the light beam is allowed to propagate in the core component, and a cladding layer (not separately shown) wrapping around the core component. The materials of the core component and the cladding layer may be determined to cause total internal reflection of the light beam when the light beam is transmitted. In some embodiments, the core component is made of a silica-based or plastic material, and the cladding layer is formed of, e.g., fluorinated polymer. In some embodiments, the optical fiber 104 includes an outer coating layer or a jacket layer (not separately shown) for providing additional cladding and/or protection. In some embodiments, the optical fiber 104 is classified into a single-mode optical fiber and a multimode optical fiber. In the depicted example, the optical fiber 104 is a single-mode optical fiber.

The photonic device 100 may include an input-stage coupler 106, a grating coupler 108, a splitter 110, an optical modulator 120, a grating coupler 112, and an output-stage coupler 114. In some embodiments, some of the abovementioned components can be omitted, or additional optical components can be added to the photonic device 100 where appropriate. The input-stage coupler 106 may be used to couple the incoming light beam from the optical fiber 104 to the photonic device 100, e.g., the grating coupler 108 of the photonic device 100. In some embodiments, the input-stage coupler 106 is an all-glass coupler. In some embodiments, the input-stage coupler 106 directs the light beam from a horizontal propagation direction to another propagation direction, e.g., a vertical direction, for facilitating processing of the light beam within the photonic device 100.

The grating coupler 108 is configured to couple the light beam from the optical fiber 104 or the input-stage coupler 106 to a waveguide of the splitter 110. In some embodiments, the grating coupler 108 includes an array of trenches or grooves on a surface of a waveguide of the grating coupler 108 to form a diffractive optical structure, which can help change the off-plane wave-vector direction of the light beam into an in-plane wave-vector direction of the waveguide of the splitter 110. The coupling efficiency of the grating coupler 108 may be related to the grating pitch, the grating depth, and the tilt angle and relative position of the input light beam, e.g., the tilt angle and the position of the incoming light beam are determined through arrangement of the input-stage coupler 106.

In some embodiments, the splitter 110 is configured to spit the incoming light beam into two or more light beams. The split light beams may be processed with various functions to include different optical properties, and may be combined in a later stage.

In some embodiments, one of the split light beams is fed into the optical modulator 120. The optical modulator 120 may perform electro-optical phase modulation to change the delay or the phase of the incoming light beam. The modulated light beam after the processing of the optical modulator 120 may become an information-bearing light beam to carry data in optical form. Alternatively, the optical modulator 120 may serve the function of optical calibration to adjust the phase or delay of the light beam.

After modulated or calibrated by the optical modulator 120, the light beam is transmitted to the grating coupler 112. The grating coupler 112 is configured to couple the light beam from a waveguide of the optical modulator 120 to the output-stage coupler 114. In some embodiments, the grating coupler 112 includes an array of trenches or grooves on a surface of a waveguide of the grating coupler 112 to form a diffractive optical structure, which can help change the an in-plane wave vector direction in the waveguide of the optical modulator 120 to an off-plane wave-vector direction for the output-stage coupler 114. The coupling efficiency of the grating coupler 112 may be related to the grating pitch, the grating depth, and the tilt angle and relative position of the output light beam, e.g., the tilt angle and the position of the outgoing light beam are determined through arrangement of the output-stage coupler 114. In some embodiments, the parameters of the grating coupler 112 is similar to or different from those of the grating coupler 108.

The output-stage coupler 114 may be used to couple the incoming light beam from the photonic device 100, e.g., the grating coupler 112, to an output device, e.g., another optical fiber. In some embodiments, the output-stage coupler 114 is an all-glass coupler. In some embodiments, the output-stage coupler 114 directs the light beam from a vertical direction to another propagation direction, e.g., a horizontal direction, for facilitating transmission of the light beam outside the photonic device 100.

Figure 2:
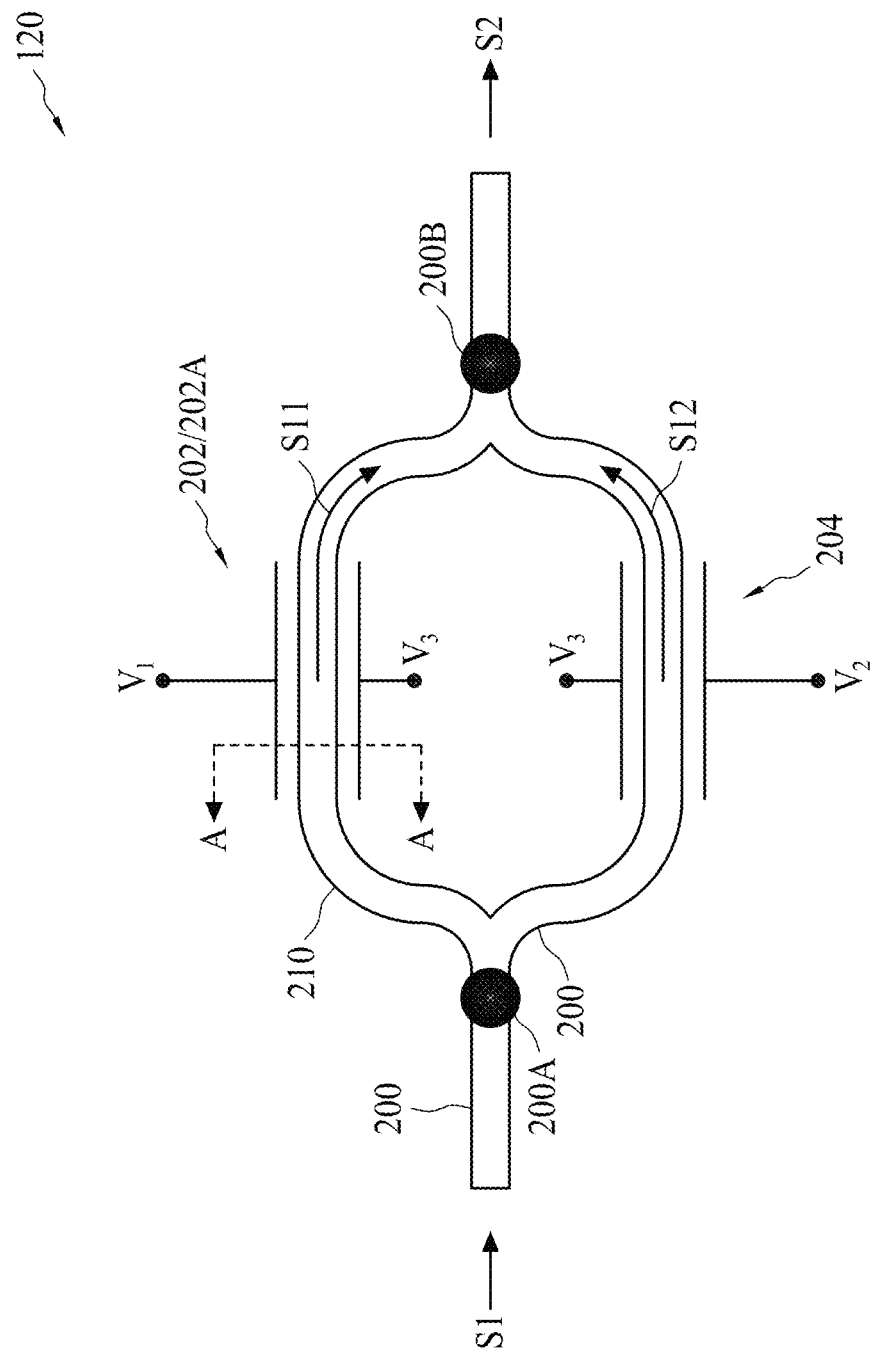
FIG. 2 is a block diagram of an optical modulator of the photonic device shown in FIG. 1, in accordance with some embodiments of the present disclosure.

FIG. 2 is a block diagram of the optical modulator 120 of the photonic device 100 shown in FIG. 1, in accordance with some embodiments of the present disclosure. The optical modulator 120 includes a substrate (not separately shown) and a waveguide 200 formed on the substrate. The waveguide 200 receives the incoming light beam S1 and outputs the outgoing light beam S2 in a horizontal direction. The waveguide 200 is divided into a first branch 210 and a second branch 220 in the middle portion of the waveguide 200. The incoming light beam S1 arrives at an input node 200A of the waveguide 200, branches into a first light beam S11 and a second light beam S12 propagating in the first branch 210 and the second branch 220, respectively. The first light beam S11 and the second light beam S12 then converge at the output node 200B of the waveguide 200.

In some embodiments, the optical modulator 120 is configured to modulate the input light beam S1 such that the modulated light beam S2 has a different phase configuration than the incoming light beam S1. In some embodiments, the optical modulator 120 is a phase modulator configured to modulate at least one of the phases of the light beam S11 or S12. In some embodiments, the optical modulator 120 includes a first phase modulator 202 on the first branch 210 and a second phase modulator 204 on the second branch 220. The first phase modulator 202 or the second phase modulator 204 may include an electrode pair configured to generate an electric field and cause a modulating current to traverse the cross section of the first branch 210 or the second branch 220. In some embodiments, the electrode pair of the first phase modulator 202 is configured to provide a modulating signal through transmitting biasing voltages V1 and V3 on the two sides of the sidewall of the first branch 210, wherein the biasing voltage V1 is different from, e.g., greater than, the biasing voltage V3. Likewise, the electrode pair of the second phase modulator 204 is configured to provide a modulating signal through transmitting biasing voltages V2 and V3 on the two sides of the sidewall of the second branch 220, wherein the biasing voltage V2 is different from, e.g., greater than, the biasing voltage V2. In some embodiments, the biasing voltages V1 and V2 may be different to achieve different phase changes on the first branch 210 and the second branch 220. In some embodiments, the biasing voltage V1 or V2 is in a range between about 0 volts and about 1.5 volts. In some embodiments, the biasing voltage V3 is ground, i.e., 0 volts, or a negative voltage.

Figure 3A:
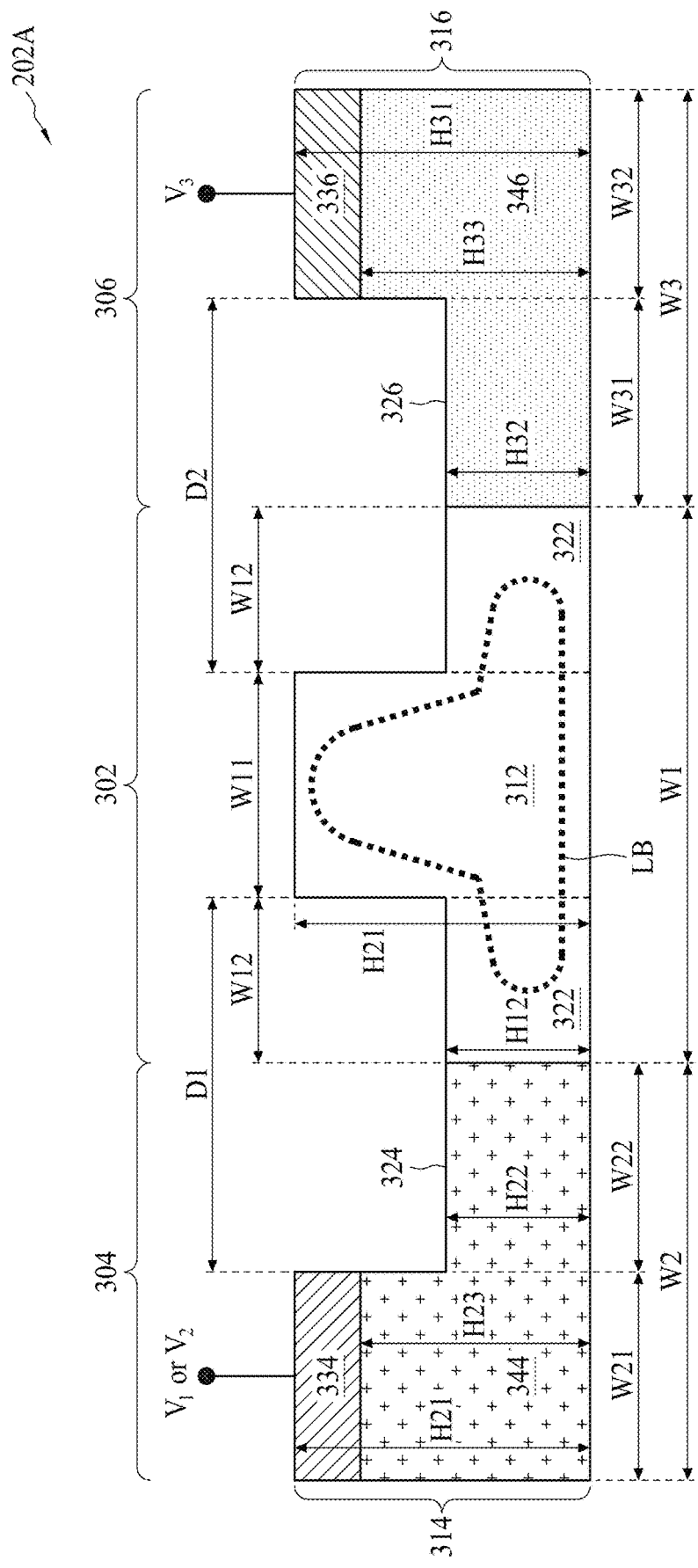
FIG. 3A is a cross-sectional view of a phase modulator, in accordance with some embodiments of the present disclosure.

FIG. 3A is a cross-sectional view of the first optical modulator 202A or the first phase modulator, in accordance with some embodiments of the present disclosure. The cross-sectional view of FIG. 3A is taken from sectional line AA of FIG. 3A, which traverses the first branch 210. The exemplary first phase modulator 202A can be seen an embodiment of the first optical modulator 202 or the second optical modulator 204. Although not shown in the figures, the structure or the cross-sectional view of the second phase modulator 204 of the optical modulator 120 is similar to FIG. 3A, and is not repeated for brevity.

The first phase modulator 202A includes a waveguide 302, a first electrode 304 and a second electrode 306 on two sides of the waveguide 302. In some embodiments, the waveguide 302 constitutes part of the first branch 210 at the first phase modulator 202A and serves as the optical path in the first phase modulator 202A, in which the light beam propagates. In some embodiments, the substrate for forming the waveguide 302 and the electrodes 304, 306 is formed of a semiconductor material, such as bulk silicon.

In some embodiments, the waveguide 302 has an inverted T-shape from a cross-sectional view. The waveguide 302 may include a first section 312 or a mesa at a central region with a height H11, and two second sections 322 on two sides of the first section 312, where the second section 322 has a height H12. In some embodiments, the first electrode 304 has a first section 314 or a mesa on one side of the first phase modulator 202A, and a second section 324 between the first section 314 and a second section 322 of the waveguide 302. The first section 314 further includes a contact 334 at the upper portion of the first section 314 and a third section 344 at the lower portion of the first section 314. The first section 314 has a height H21, and the second section 324 has a height H22. Likewise, in some embodiments, the second electrode 306 has a first section 316 or a mesa on the other side of the first phase modulator 202A, and a second section 326 between the first section 316 and the other second section 322 of the waveguide 302. The first section 316 further includes a contact 336 at the upper portion of the first section 316 and a third section 346 at the lower portion of the first section 316. The first section 316 has a height H31, and the second section 326 has a height H32. In some embodiments, the first section 314 and the second section 324 form an L-shape, and the first section 316 and the second section 326 form an L-shape. In some embodiments, the height H23 or H33 or the third section 344 or 346 is in a range between about 0.25 μm and about 0.3 μm, e.g., 0.27 μm.

The heights H11 and H12 are determined according to the optical mode of the light beam propagating in the waveguide 302. In the depicted embodiment, the waveguide 302 is designed as a single-mode waveguide. If the ranges of the heights H11, H12 do not match the diameter of the optical mode of the light beam, the transmission loss will be noticeable. The cross-sectional profile LB of the light beam will extend within the T-shape of the waveguide 302 and is kept separated from the doped regions of the second sections 324, 326. In some embodiments, the height H11 is greater than the height H12. The height H11 is in a range of between 0.25 μm and about 0.45 μm, e.g., 0.37 μm. The height H12 is in a range of between 0.05 μm and about 1.0 μm, e.g., 0.07 μm. In some embodiments, a ratio between the height H11 and the height H21 is between about 1.5 and about 5.0, or between about 2.5 and 4.5.

In some embodiment, the height H21 is greater than the height H22. Likewise, in some embodiment, the height H31 is greater than the height H32. In some embodiments, a ratio between the height H21 and the height H22 or between the height H31 and the height 32 is between about 1.5 and about 5.0, or between about 2.5 and 4.5. In some embodiments, a first height ratio H21/H22 is substantially equal to a second height ratio H31/H32.

In some embodiments, the second sections 324, 326 have different cross section areas, measured along a direction perpendicular to a direction in which the modulating signal flows, than a cross section area of the second sections 322. The second sections 324, 326 may have greater cross sectional areas than that of the second section 322 to achieve less bulk resistance of the diode at the second sections 324, 326. Likewise, the second sections 322 may have greater cross sectional areas than that of the second sections 324, 326 to achieve less bulk resistance of the diode at the second sections 324, 326.

In some embodiment, the first phase modulator 202A has two stages or levels from a cross-sectional view. For example, the heights H11, H21 and H31 are substantially equal, and the heights H11, H22 and H32 are substantially equal. In some embodiments, the first phase modulator 202A has more than two stages or levels from a cross-sectional view. For example, the height H11 is different from the height H21 or H31, or the height H12 is different from the height H22 or H32.

In some embodiments, the first phase modulator 202A includes two areas, in which the first area corresponds to the waveguide 302 with a width W1, and the second area corresponds to the phase-modulating diode including the electrode 304 with a width W2 and the electrode 306 with a width W3. All the widths W1, W2, W3 are measured based on a bottom portion of the first phase modulator 202A. In some embodiments, the first section 312 has a width W11, and each of the second sections 322 has a width W12. In some embodiments, the width W11 is determined according to the optical mode of the light beam propagating in the waveguide 302. In the depicted embodiment, the waveguide 302 is designed as a single-mode waveguide. In some embodiments, the determination of the width W11 is related to the heights H11 and H12 to match the optical mode of the light beam. In some embodiments, the width W11 is in a range between about 0.35 μm and about 0.4 μm, e.g., 0.37 μm. In some embodiments, the first section 314, the third section 344 or the contact 334 has a width W21 and the second section 324 has a width W22. Likewise, in some embodiments, the first section 316, the third section 346 or the contact 336 has a width W31 and the second section 326 has a width W32. In some embodiments, the first section 311 is spaced apart from the first section 314 or 316 by a distance D1 or D2, respectively. In some embodiments, the distance D1 or D2 is in a range between about 0.6 μm and 0.7 μm, e.g., 0.66 μm.

In some embodiments, the light beam propagates in the first section 312 and the second section 322 of undoped regions, and therefore the width W22 or W32 of the doped regions in the second sections 324, 326 is determined according to the profile LB of the optical mode of the light beam propagating in the waveguide 302. In some embodiments, the width W22 or W32 is in a range between about ⅓ and about ½ of the distance D1 or D2.

The waveguide 302 is contiguous with the first electrode 304 and the second electrode 306 since they are formed from a same substrate. In some embodiments, the substrate for forming the waveguide 302 and the electrodes 304, 306 is silicon, which material is attractive for its compatibility with most existing semiconductor manufacturing materials and processes. The silicon may be formed by epitaxy or other suitable silicon growth methods. The two second sections 322 of the waveguide 302 extend toward the first electrode 304 and the second electrode 306. The boundary between the waveguide 302 and electrodes 304, 306 is defined by their doping concentration differences. The waveguide 302 is formed as an intrinsic or undoped region of the substrate in order to ensure efficient propagation of the light beam. In some embodiments, the first phase modulator 202A can be seen as a phase-modulating diode with a P-type contact 334, an N-type contact 336, and a channel region arranged between the contacts 334, 336 and formed of the second sections 224, 226, the third sections 244, 246, and lower portions of the waveguide 302. The first electrode 304 and the second electrode 306 of the first phase modulator 202A are doped regions configured as a positive pole and a negative pole, respectively, of the diode for conducting current flowing through the first section 314, the second section 324, the waveguide 302, the second section 326 and the first section 316, in response to the biasing voltages V1 and V3. Therefore, in order to serve the function of conducting current in the silicon-based material, an appropriate doping concentration scheme for the electrodes 304, 306 is required.

To reduce electrical resistance of the channel region of the diode, the silicon-based electrodes 304, 306 are doped with suitable dopants. For example, the first electrode 304, including the second section 324, the third section 344 and the contact 334, is a doped region and doped with P-type dopants, e.g., boron, indium or other suitable P-type dopants. The second electrode 306, including the second section 326, the third section 346, and the contact 336, is a doped region and, and doped with N-type dopants, e.g., arsenic, phosphor, or other suitable N-type dopants.

The variation of the doping concentration of the electrodes 304, 306 may lead to two different effects. On one hand, the increase of the doping concentration means increase of the number of electrons and holes in contribution to the electric current, which will increase the index of refraction of the material, e.g., silicon. A higher index of refraction will in turn lead to greater phase change of the light beam in the first phase modulator 202A. Moreover, heat generated by the current conduction process would also adversely offset the phase change caused by the modulating current. Thus, elevating the doping concentration can increase the current and reduce resistance-generated heat simultaneously to thereby increase the phase change sensibility of the first phase modulator 202A.

On the other hand, however, the increase of the conduction current will also increase the light absorption rate of the waveguide material, thereby frustrating the optical transmission efficiency. Therefore, a better tradeoff is sought for the doping concentration of the electrodes 304, 306 to pursue lowest electrical resistance while maintaining the light absorption rate at a reasonable level. A maximal doping concentration of the channel region of the electrode 304 or 306 is determined based on the aforesaid tradeoff and upper/lower limits of the electrical resistance. In some embodiments, the first electrode 304, including the third section 344 and the second section 324, has a doping concentration between about $5E17$ atoms/cm$^3$ and about $1E20$ atoms/cm$^3$, or between about $5E18$ atoms/cm$^3$ and $5E19$ atoms/cm$^3$, e.g., $1E19$ atoms/cm$^3$. In some embodiments, the second electrode 306, including the third section 346 and the second section 326, has a doping concentration between about $5E17$ atoms/cm$^3$ and about $1E20$ atoms/cm$^3$, or between about $5E18$ atoms/cm$^3$ and $5E19$ atoms/cm$^3$, e.g., about $1E19$ atoms/cm$^3$. If the target doping concentration is determined to be greater than about $1E20$ atoms/cm$^3$, the implantation operation may not be successful since the dopants may cause a surface saturation effect according to an implantation capability of the implanter, and therefore the doping concentration cannot be arbitrarily high.

The contacts 334 and 336 are configured to include doping concentrations greater than those of the channel regions of the electrodes 304, 306 for reducing contact resistance between the electrodes 304, 306 and the conductive members to which the electrodes 304, 306 are attached. In some embodiments, the contacts 334, 336 have a doping concentration between about $1E20$ atoms/cm$^3$ and about $1E22$ atoms/cm$^3$.

Figure 3B:
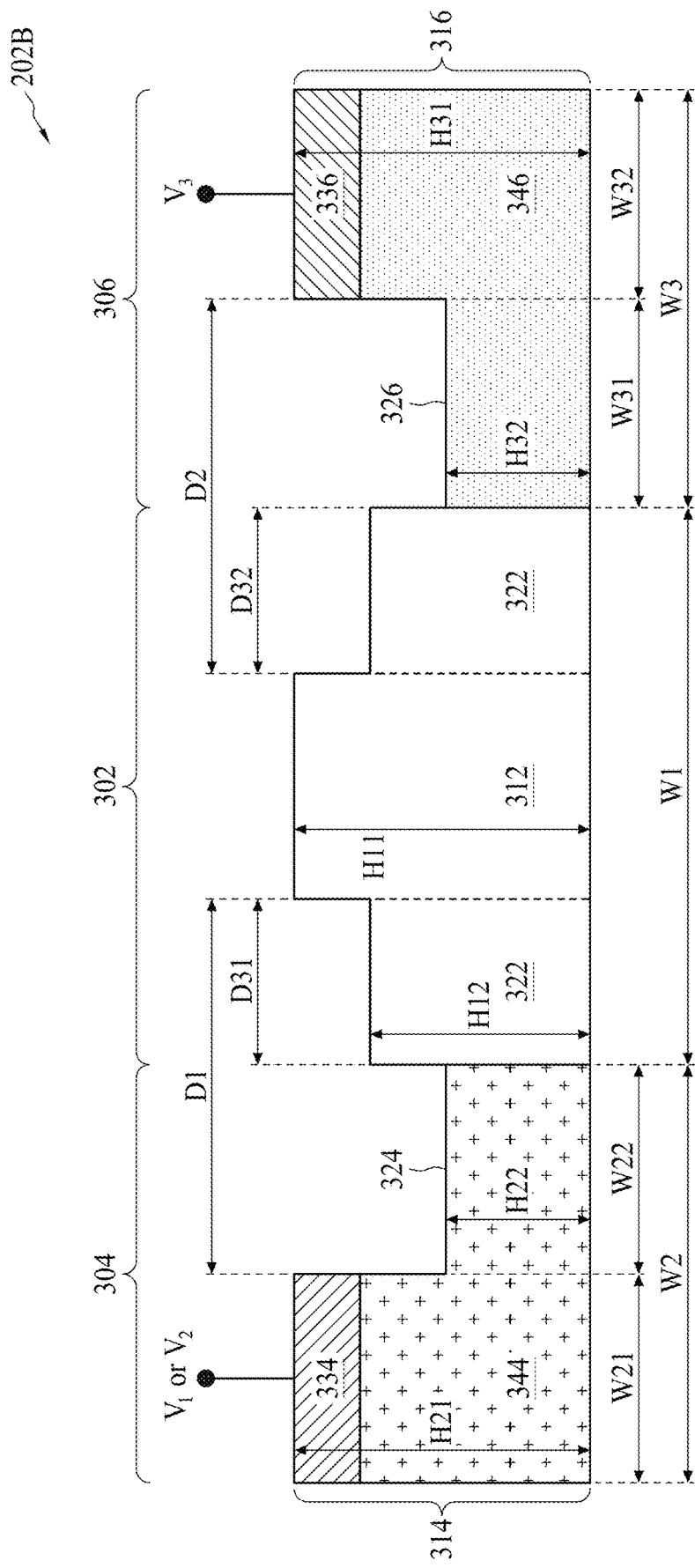
FIG. 3B is a cross-sectional view of a phase modulator, in accordance with some embodiments of the present disclosure.

FIG. 3B is a cross-sectional view of a first phase modulator 202B, in accordance with some embodiments of the present disclosure. The first phase modulator 202B is similar to the first phase modulator 202A in many aspects, and these similar aspects are not repeated for brevity. The first phase modulator 202B is different from the first phase modulator 202A in that the upper surfaces of the second sections 322 are higher than the upper surfaces of the second sections 324. The higher upper surfaces of the second section 322 means greater cross section areas of the second section 322 as compared to the second section 322 of the first phase modulator 202A shown in FIG. 3A. As a result, the bulk resistance of the diode at the second section 322 can be reduced due to its greater current conduction area. As a result, the overall bulk resistance of the first phase modulator 202B can be further reduced as compared to the first phase modulator 202A, thereby improving the modulation performance of the first phase modulator 202B. In some embodiments, the height H22 or H32 is in a range between about 0.05 μm and about 0.1 μm, e.g., 0.07 μm. In some embodiments, the height H23 or H33 is in a range between about 0.15 μm and about 0.25 μm, e.g., 0.2 μm. In some embodiments, a maximal value of the height H22 or H32 is equal to the height H23 or H33, respectively. In some embodiments, the two second sections 322 have substantially equal heights H12 for preserving light propagation performance.

Figure 3C:
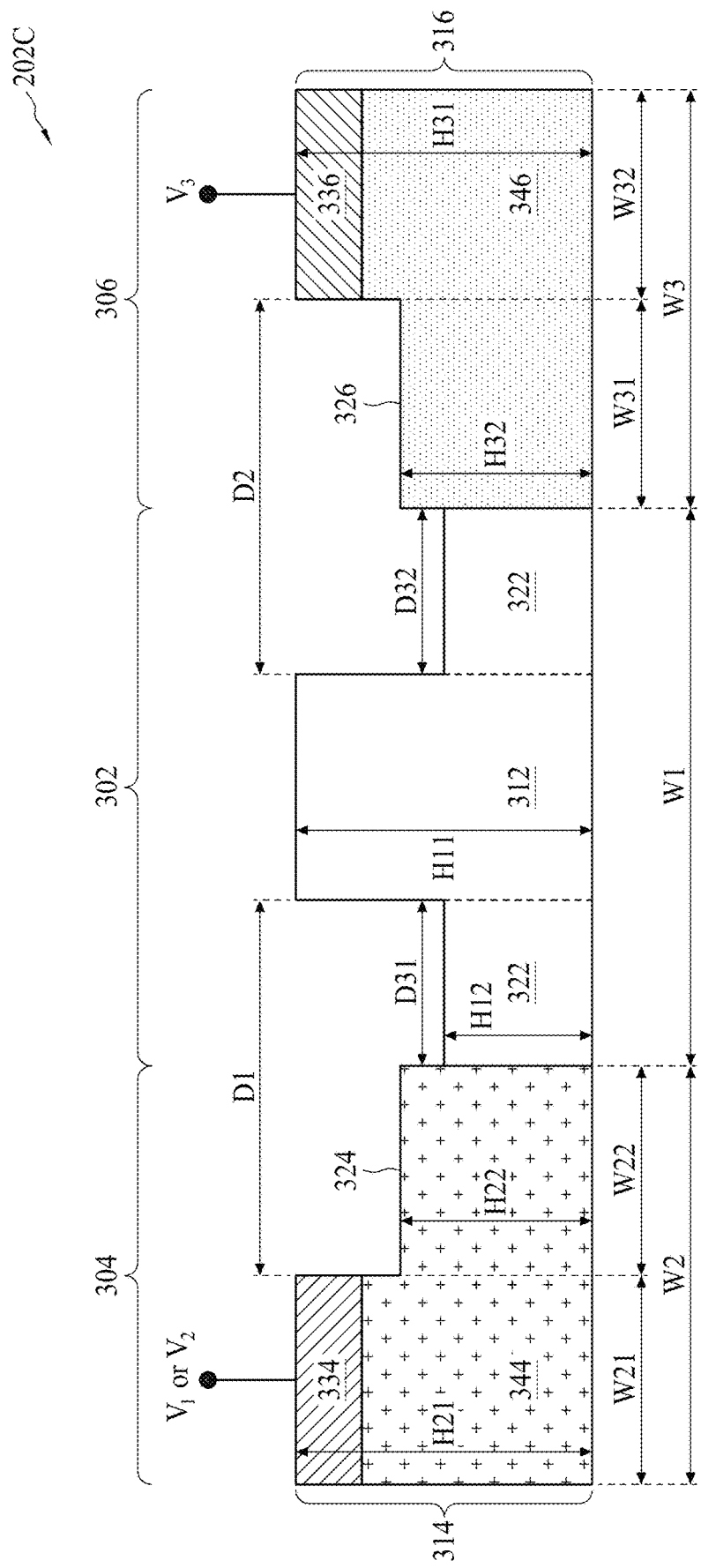
FIG. 3C is a cross-sectional view of a phase modulator, in accordance with some embodiments of the present disclosure.

FIG. 3C is a cross-sectional view of a first phase modulator 202C, in accordance with some embodiments of the present disclosure. The first phase modulator 202C is similar to the first phase modulator 202A or 202B in many aspects, and these similar aspects are not repeated for brevity. The first phase modulator 202C is different from the first phase modulator 202A or 202B in that the upper surfaces of the second sections 322 are lower than the upper surfaces of the second sections 324. The higher upper surfaces of the second section 324 means greater cross section areas of the second section 324 as compared to the second section 322 of the first phase modulator 202A shown in FIG. 3A. As a result, the bulk resistance of the diode at the second section 322 can be reduced due to greater current conduction area. As a result, the overall bulk resistance of the first phase modulator 202C can be further reduced as compared to the first phase modulator 202A, thereby improving the modulation performance of the phase modulator 202C. In some embodiments, the height H12 is in a range between about 0.05 μm and about 0.1 μm, e.g., 0.07 μm. In some embodiments, the height H22 is in a range between about 0.15 μm and about 0.25 μm, e.g., 0.2 μm.

Referring to FIGS. 3A, 3B and 3C, the first sections 314, 316 or the second sections 324, 326 have a length P measured in the Y-axis perpendicular to the direction in which the modulating current flows. The length P is determined according to the specification of the modulated phase of the first phase modulators 202A through 202C, and therefore the optimization of the electrical resistance of the phase-modulating diode would lie in the height and the doping concentration of the first sections 314, 316 or the second sections 324, 326.

Figure 3D:
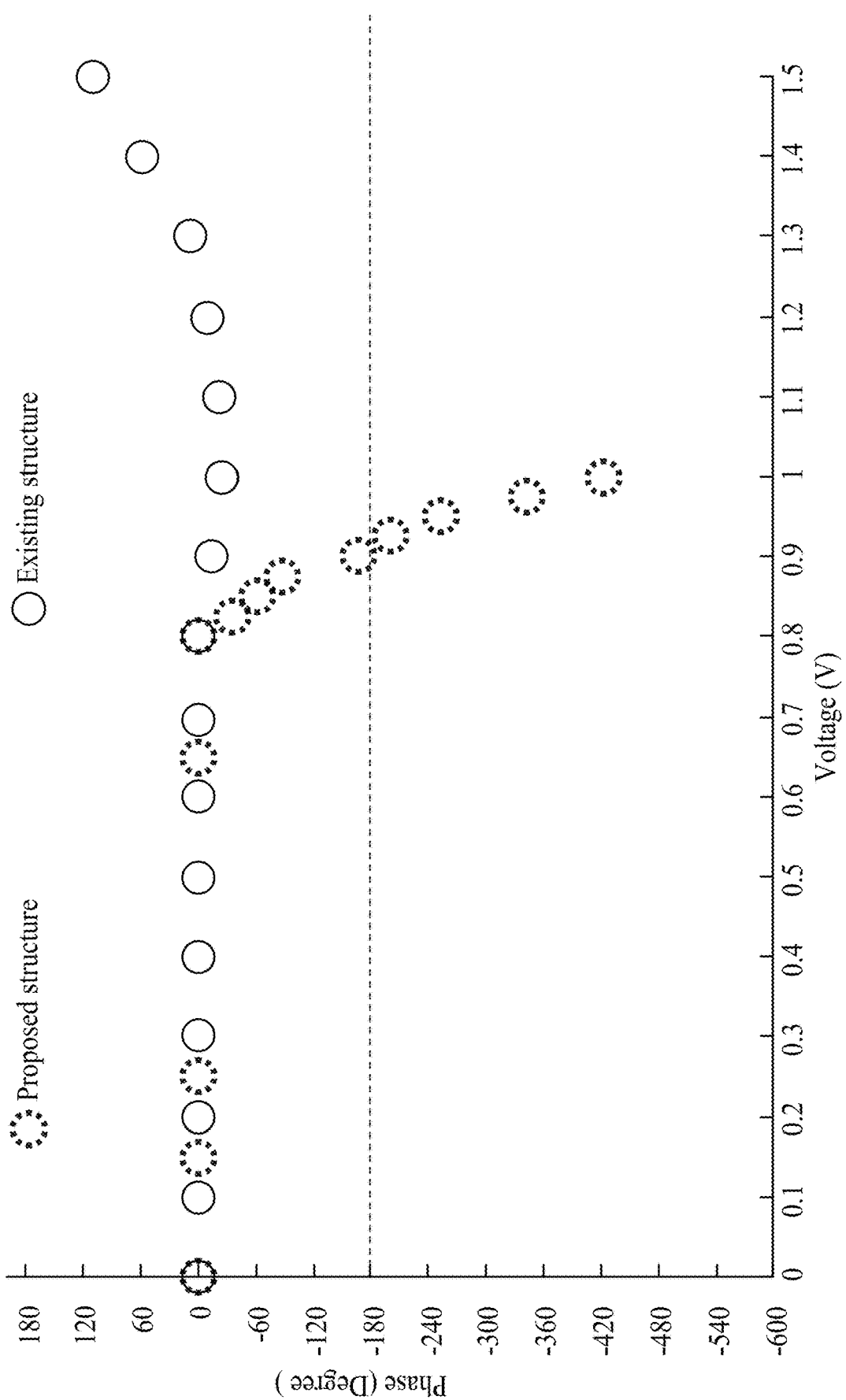
FIG. 3D is a plot showing a phase change performance of the optical modulator shown in FIG. 3A with respect to a modulating voltage, in accordance with some embodiments of the present disclosure.

FIG. 3D is a plot showing a phase modulation performance of the optical modulator 120 shown in FIG. 3A with respect to a modulating voltage, in accordance with some embodiments of the present disclosure. Two simulated dotted curves are shown, representing modulated phases for an existing approach with a lower doping concentration, e.g., at about 1E17 atoms/cm$^3$, and the proposed doping concentration, e.g., at about 1E19 atoms/cm$^3$. The horizontal axis represents the magnitude of the modulating voltage in volts, and the vertical axis represents the phase in degrees. As shown in FIG. 3D, the phase change performance of the existing approach is close to the proposed method in a low to medium modulating voltage levels, in which the phase of the light beam does not seem to change due to insufficient current level. When the modulating voltage continues to increase, the proposed method causes a monotonically decreasing phase change along the increase of the modulating voltage, while the existing approach causes the phase to move around the zero degree, in which the trend is neither monotonically increasing nor monotonically decreasing, and even rise up to a positive phase. This undesired result of the insensitive phase change of the existing approach may be attributed to the relatively high resistance of the electrodes, in which a great amount of heat is generated by the high modulating voltage. The accumulated heat makes the waveguide to function in a relatively high temperature, and therefore the phase change in the negative phase direction due to the electrons and holes is offset by the heat-induced phase change in the positive phase direction. Based on the above, it is shown that the electrical resistance reduction of the electrodes 304, 306 plays an important role in the phase change sensitivity of the first phase modulator 202.

FIGS. 4A to 4E are cross-sectional views and top views of intermediate stages of a method 400 of forming an optical modulator, e.g., the optical modulator 120, in accordance with some embodiments of the present disclosure. The cross-sectional views shown in the left plot of FIGS. 4A to 4E are taken from the sectional lines BB of the top views shown in the right plot of the respective figures. Additional steps can be provided before, during, and after the steps shown in FIGS. 4A to 4E, and some of the steps described below can be replaced or eliminated in other embodiments of the method 400. The order of the steps may be interchangeable.

Figure 4A:
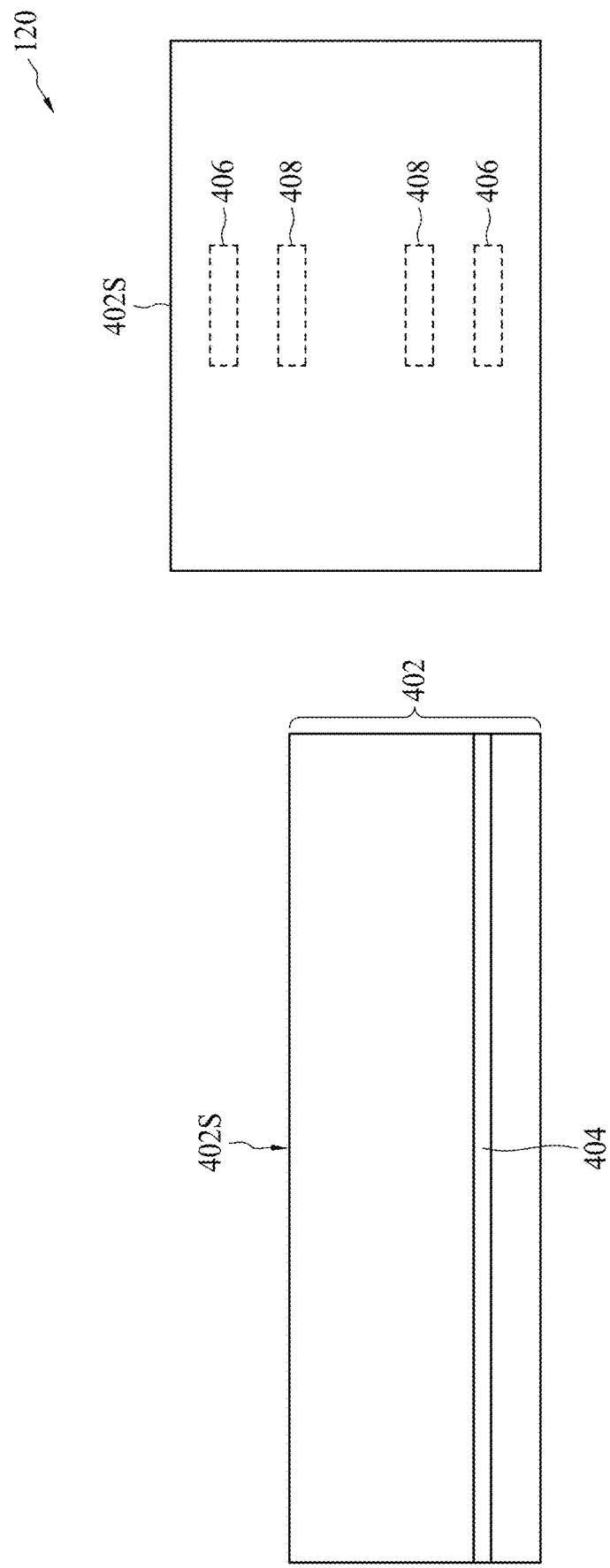
FIGS. 4A to 4E are cross-sectional views and top views of intermediate stages of a method of forming a phase modulator, in accordance with some embodiments of the present disclosure.

Referring to FIG. 4A, a substrate 402 including an upper surface 402S is received or provided. In some embodiments, the substrate 402 includes silicon. In some embodiments, the substrate 402 is undoped. The substrate 402 may be bulk silicon. The substrate 402 may be a silicon-on-insulator (SOI) substrate, in which an insulating layer 404 is embedded in the substrate 402. The insulating layer 404 may be formed of a dielectric layer, e.g., silicon oxide, silicon nitride, or other suitable dielectric materials. In some embodiments, the areas for the doped regions of the electrodes 304, 306 are defined, as illustrated by the dashed boxes in the top view of FIG. 4A.

Figure 4B:
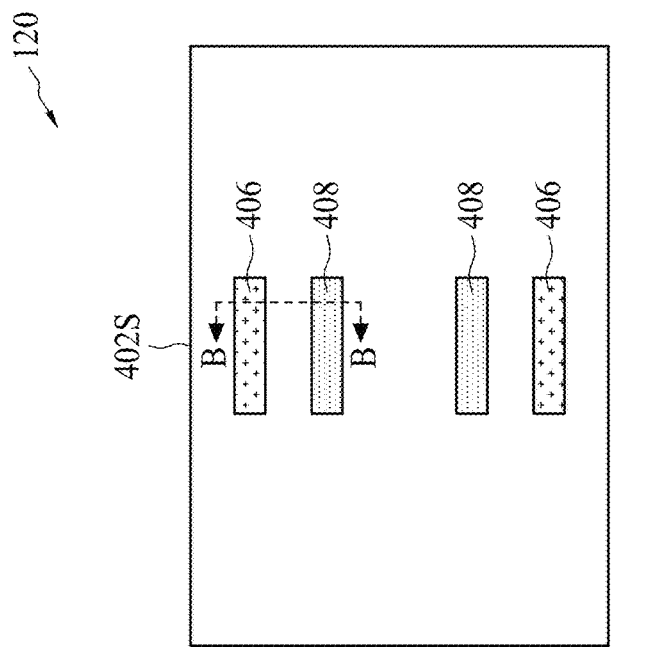
Figure 4B:
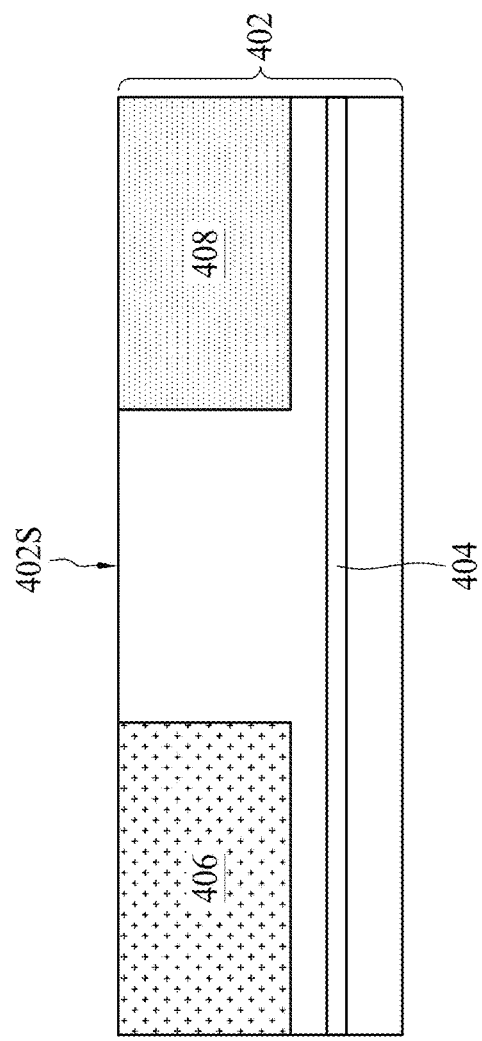

Referring to FIG. 4B, two pairs of doped regions 406 and doped regions 408 are formed in upper regions of the substrate 402. Each pair of the doped region 406 and the doped region 408 are spaced by a distance W1. The distance W1 determines a width of a waveguide to be formed in the substrate 402. The two doped region pairs are formed for the respective phase modulators 202 and 204 on the first branch 210 and the second branch 220, respectively. The doped regions 406 are used to form the channel regions of the positive poles of the respective phase modulators 202 and 204, while the doped regions 408 are used to form the channel regions of the negative poles of the respective phase modulators 202 and 204. A first ion implantation operation is performed to form the doped regions 406 in the channel region. The dopants used in the first ion implantation operation include P-type dopants, such as boron or indium. A second ion implantation operation is performed to form the doped regions 408. The dopants used in the doped region 408 include N-type dopants, such as arsenic or phosphor. In some embodiments, a patterned mask layer may be formed over the substrate 402 to serve as the implant mask and expose only the upper surface of the doped region 406 or the dope region 408 during the first or second ion implantation operation. The patterned mask layer may be removed after the first or second ion implantation operation is completed. The depth of the doped regions 406 or 408 are controlled by the power level of the implanter used in the first or second ion implantation. In some embodiments, the doped regions 406 or 408 has a doping concentration between about 5E17 atoms/cm$^3$ and about 1E20 atoms/cm$^3$, or between about 5E18 atoms/cm$^3$ and 5E19 atoms/cm$^3$, e.g., about 1E19 atoms/cm$^3$.

In some embodiments, a thermal operation is performed subsequent to the first or second ion implantation operation to activate the implanted ions and cause a more uniform doping concentration distribution in the doped regions 406 or 408.

Figure 4C:
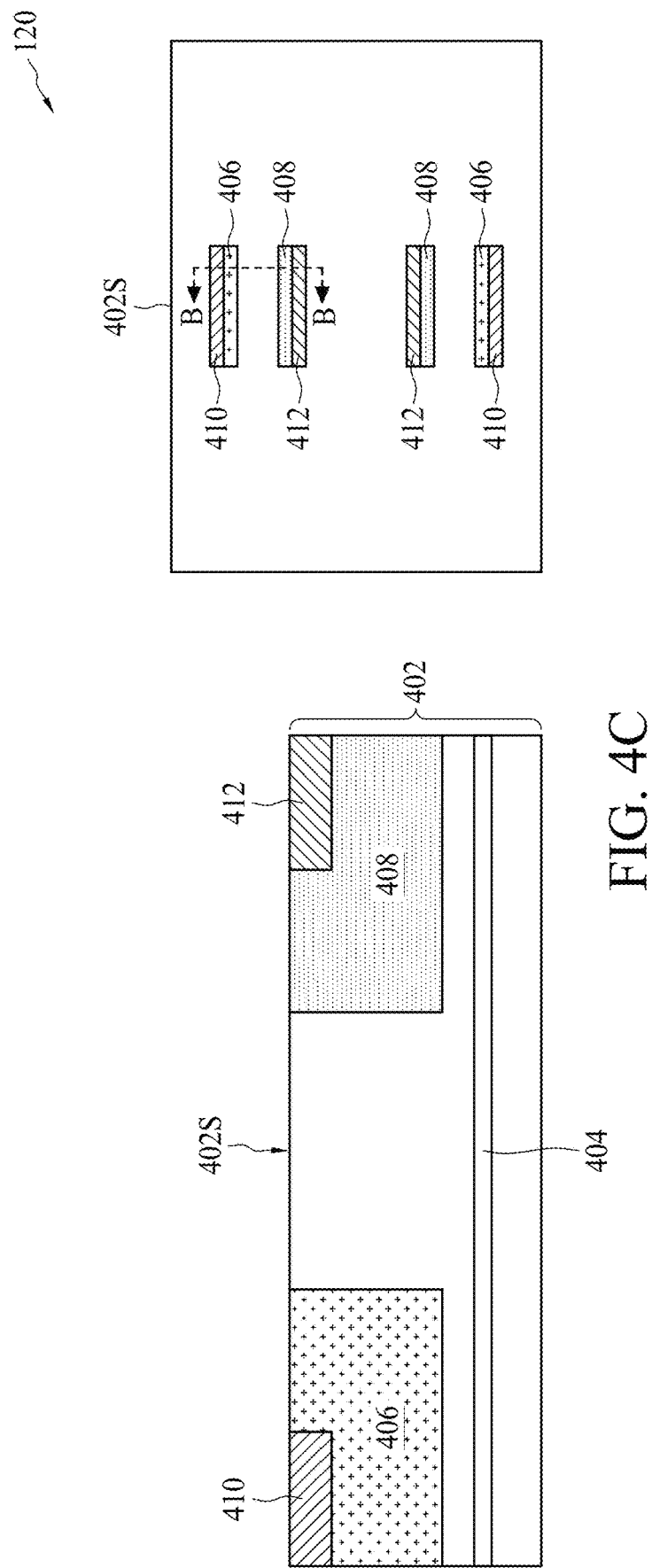

Referring to FIG. 4C, two pairs of highly-doped regions 410 and highly-doped regions 412 are formed. The highly-doped region 410 is used to form the contact 334 of the positive poles of the respective phase modulators 202 and 204, while the highly-doped regions 412 are used to form the contacts 336 of the negative poles of the respective phase modulators 202 and 204. A third ion implantation operation is performed to form a highly-doped region 410 in an upper portions of the doped regions 406. The dopants used in the third ion implantation operation include P-type dopants, such as boron or indium. A fourth ion implantation operation is performed to form a highly-doped region 412 in an upper portions of the doped regions 408. The dopants used in the fourth ion implantation include N-type dopants, such as arsenic or phosphor. In some embodiments, a patterned mask layer may be formed over the substrate 402 to serve as the implant mask and expose only the upper surface of the highly-doped region 410 or the highly-dope region 412 during the third or fourth ion implantation operation. The patterned mask layer may be removed after the third or fourth ion implantation operation is completed. The depth of the highly-doped region 410 or 412 are controlled by the power level of the implanter used in the third or fourth ion implantation. In some embodiments, the highly-doped region 410 or 412 has a doping concentration between about 1E20 atoms/cm$^3$ and about 1E22 atoms/cm$^3$.

In some embodiments, a thermal operation is performed subsequent to the third or fourth ion implantation operation to activate the implanted ions and cause a more uniform doping concentration distribution in the highly-doped region 410 or 412.

Figure 4D:
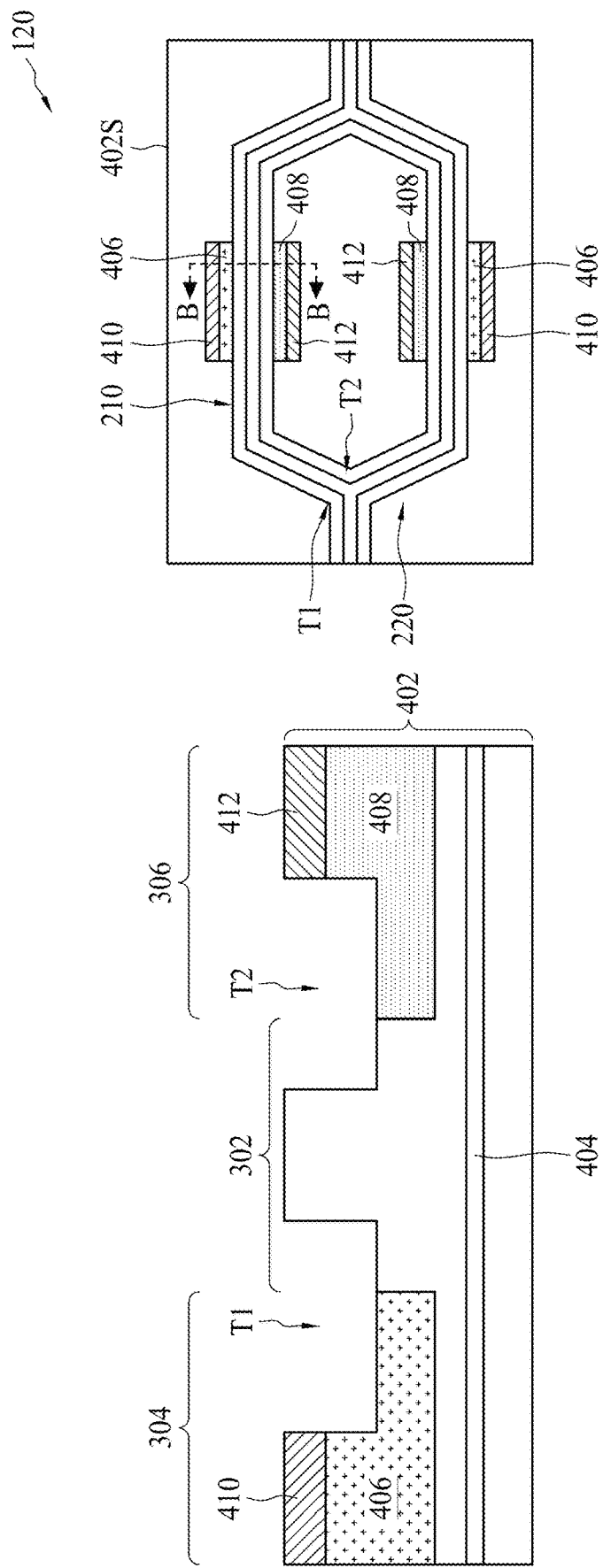

Referring to FIGS. 3A and 4D, a patterning operation is performed on the substrate 402 to form the waveguides 302 as the first branch 210 and the second branch 220, each including two trenches T1 and T2. The waveguides 302, the electrodes 304 and 306 in each of the phase modulators 202, 204 are formed accordingly. The patterning operation may be performed by a dry etch, a wet etch, a reactive ion etch (RIE), or the like. In some embodiments, the patterning operation forms substantially flat surfaces on the sidewalls or the bottoms of the trenches T1 and T2 to avoid undesirable light loss from the waveguide 302.

Figure 4E:
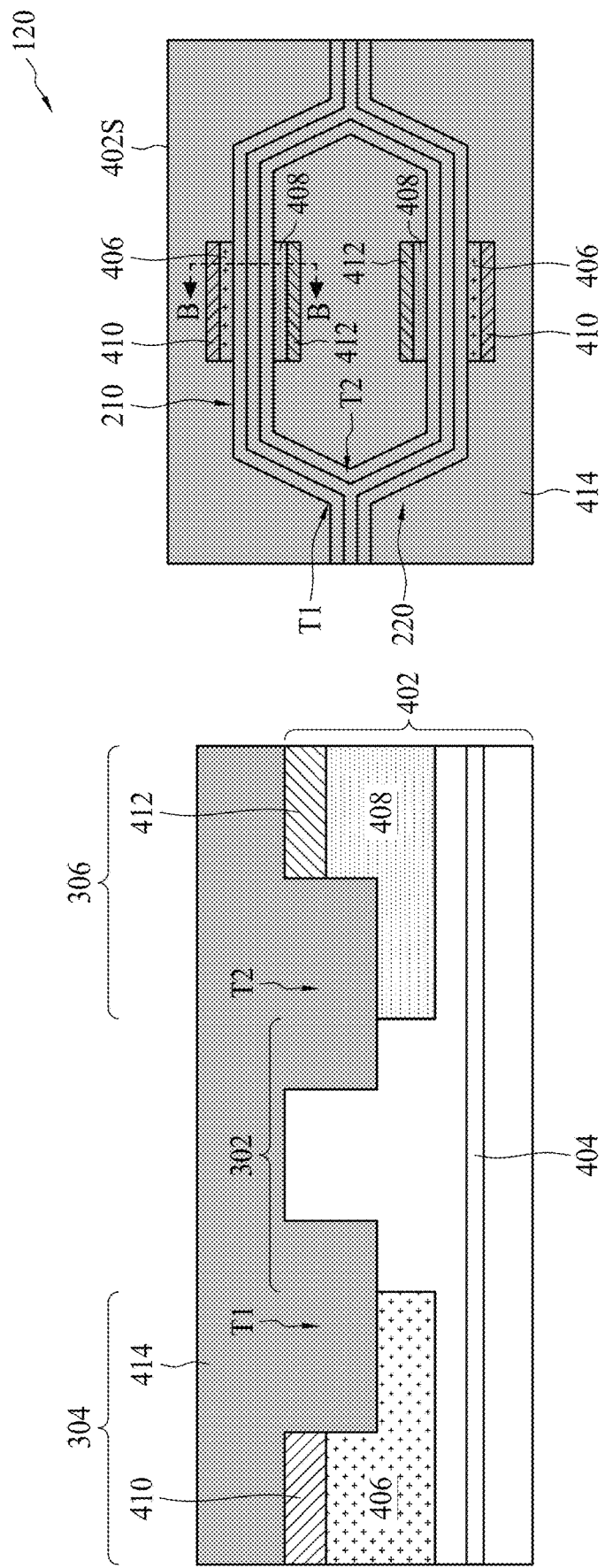

Referring to FIG. 4E, a cladding layer 414 is formed over the waveguide 302 and the electrodes 304, 306. In some embodiments, the cladding layer 414 is formed of silicon oxide or other suitable materials. The cladding layer 414 is formed to cover the waveguides 302 and the electrodes 304, 306. The index of refraction of the cladding layer is less than that of the waveguide 302 in order to constitute total internal reflection of the light beam during propagation in the waveguide. The cladding layer 414 may also cover or wrap around the first branch 210 and the second branch 220 of the waveguides 302 and fill the trenches T1, T2 in the optical modulator 120.

FIGS. 5A to 5D are cross-sectional views of intermediate stages of a method 500 of forming a phase modulator 502, e.g., the first phase modulator 202B, in accordance with some embodiments of the present disclosure. Additional steps can be provided before, during, and after the steps shown in FIGS. 5A to 5E, and some of the steps described below can be replaced or eliminated in other embodiments of the method 500. The order of the steps may be interchangeable. The phase modulator 502 is similar to the phase modulator 202 in many aspects, and these similar aspects are not repeated for brevity.

Figure 5A:
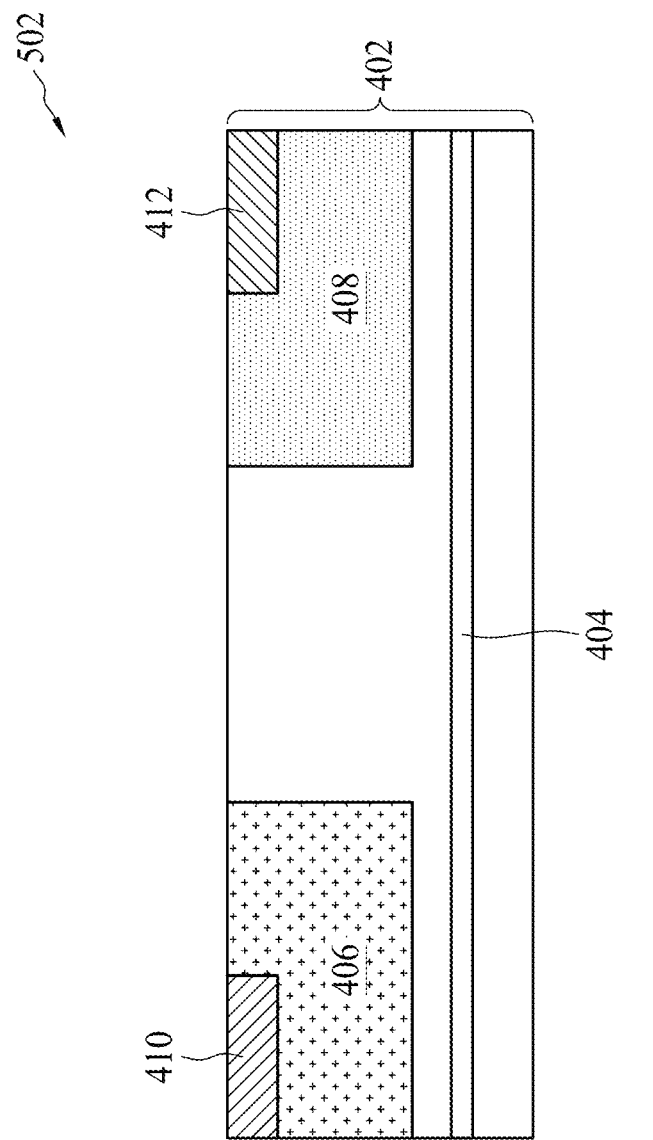
FIGS. 5A to 5D are cross-sectional views of intermediate stages of a method of forming a phase modulator, in accordance with some embodiments of the present disclosure.
Figure 5B:
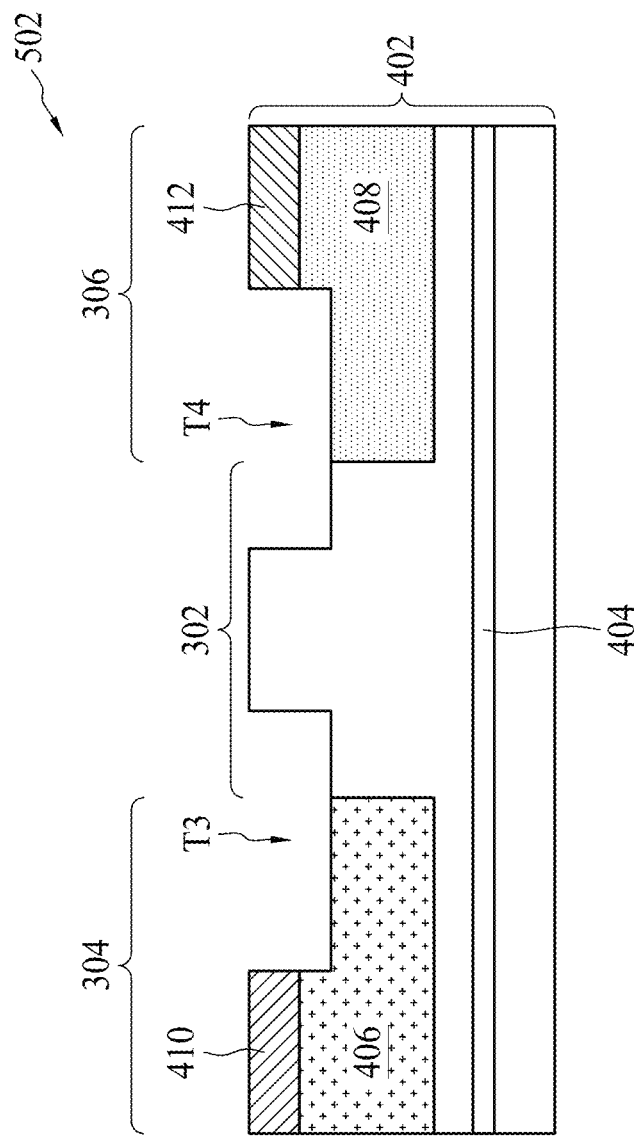

Referring to FIG. 5A, the substrate 402 is received or provided. The doped regions 406, 408, 410 and 412 are formed in the substrate 402 and spaced by a distance W1 in a similar manner to those discussed with reference to FIGS. 4A to 4C. Referring to FIGS. 3B and 5B, a first patterning operation is performed to form trenches T3 and T4. The patterning operation may be performed by a dry etch, a wet etch, an RIE, or the like. In some embodiments, the first patterning operation forms substantially flat surfaces on the sidewalls or the bottoms of the trenches T3 and T4 to avoid undesirable light loss from the waveguide 302. The depths of the trenches T3 and T4 may be different than the depths of the trenches T1 and T2. Sidewalls of the contacts 334 and 336 are fully exposed through the first patterning operation.

Figure 5C:
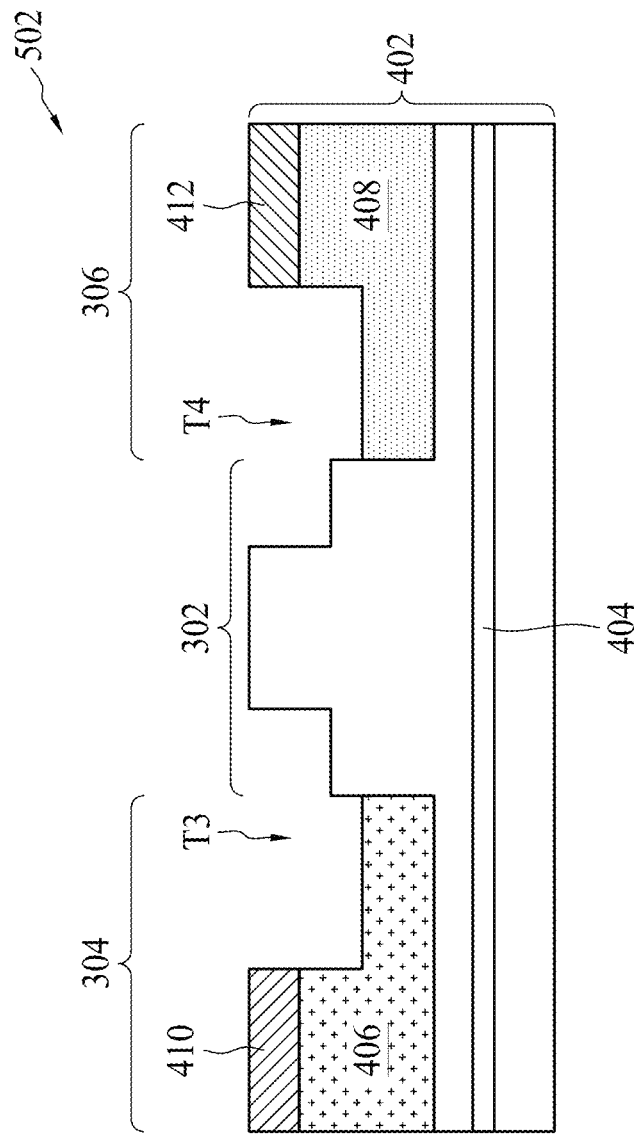

Referring to FIGS. 3B and 5C, a second patterning operation is performed to pattern the second sections 324 and 326 of the electrodes 304, 306, respectively. The trenches T3 and T4 run downward further in the areas of the second sections 324 and 326 such that the upper surfaces of the second sections 324, 326 are lower than the upper surface of the second sections 322. The second patterning operation may be performed by a dry etch, a wet etch, an RIE, or the like. In some embodiments, the second patterning operation forms substantially flat surfaces on the sidewalls or the bottoms of the trenches T3 and T4 to avoid undesirable light loss from the waveguide 302. The depths of the bottoms of the trenches T3 and T4 shown in FIG. 5C may be different than the depths of the trenches T1 or T2. Through the second patterning operation, only sidewalls of the contacts 334, 336 and upper portions of the sidewalls of the second sections 322 are exposed.

Figure 5D:
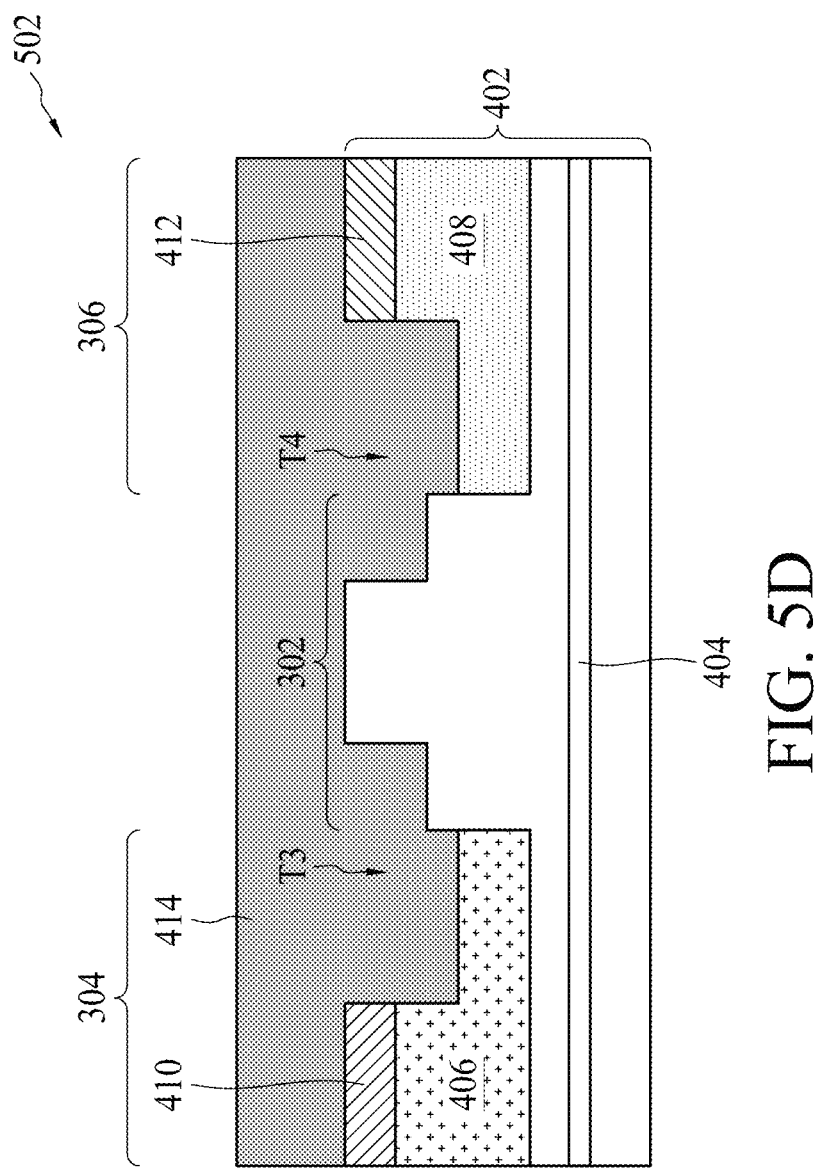

Referring to FIG. 5D, the cladding layer 414 is formed over the waveguide 302 and the electrodes 304, 306. The cladding layer 414 may also cover or wrap around the first branch 210 and the second branch 220 of the waveguides 302 and fill the trenches T3, T4 in the optical modulator 120.

Figure 6A:
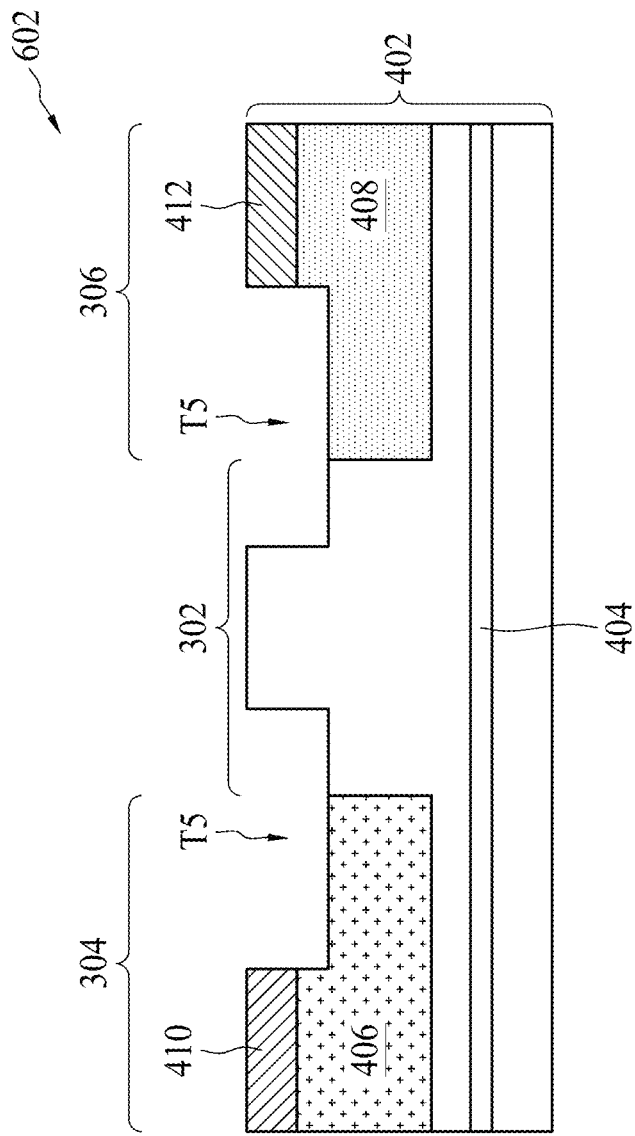
FIGS. 6A to 6C are cross-sectional views of intermediate stages of a method of forming a phase modulator, in accordance with some embodiments of the present disclosure.
Figure 6B:
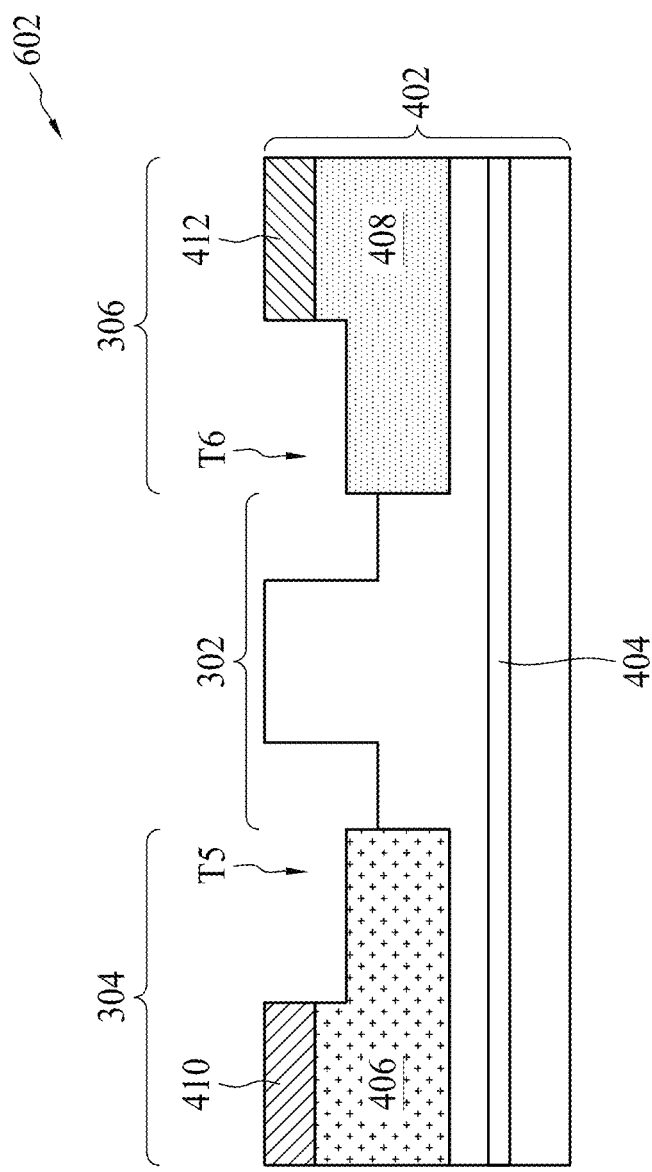
Figure 6C:
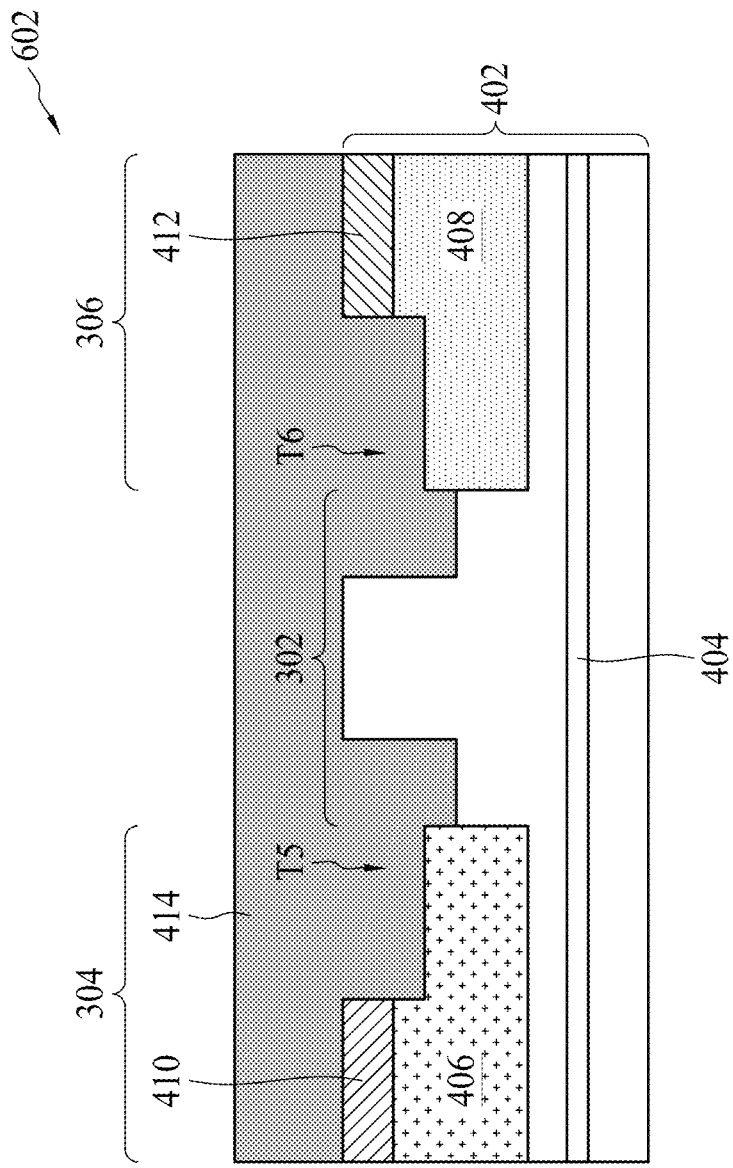

FIGS. 6A to 6C are cross-sectional views of intermediate stages of a method 600 of forming a phase modulator 602, e.g., the first phase modulator 202C, in accordance with some embodiments of the present disclosure. Additional steps can be provided before, during, and after the steps shown in FIGS. 6A and 6B, and some of the steps described below can be replaced or eliminated in other embodiments of the method 600. The order of the steps may be interchangeable. The phase modulator 602 is similar to the phase modulator 202 or 502 in many aspects, and these similar aspects are not repeated for brevity.

Referring to FIGS. 3C and 6A, the substrate 402 is received or provided. The doped regions 406, 408, 410 and 412 are formed in the substrate 402 and spaced by a distance W1. A first patterning operation is performed to form trenches T5 and T6. The abovementioned steps are performed in a similar manner to those discussed with reference to FIGS. 4A to 4C or FIGS. 5A to 5B.

Referring to FIGS. 3C and 6B, a second patterning operation is performed to pattern the second sections 322 of the waveguide 302. The trenches T5 and T6 run downward further in the areas of the second sections 322 such that the upper surfaces of the second sections 324, 326 are higher than the upper surface of the second sections 322. The second patterning operation may be performed by a dry etch, a wet etch, an RIE, or the like. In some embodiments, the second patterning operation forms substantially flat surfaces on the sidewalls or the bottoms of the trenches T5 and T6 to avoid undesirable light loss from the waveguide 302. The depths of the bottoms of the trenches T5 and T6 shown in FIG. 6B may be different than the depths of the trenches T1 or T2, or the depths of the bottoms of the depths T3 or T4.

Referring to FIG. 6C, the cladding layer 414 is formed over the waveguide 302 and the electrodes 304, 306. The cladding layer 414 may also cover or wrap around the first branch 210 and the second branch 220 of the waveguides 302 and fill the trenches T5, T6 in the optical modulator 120.

Figure 7:
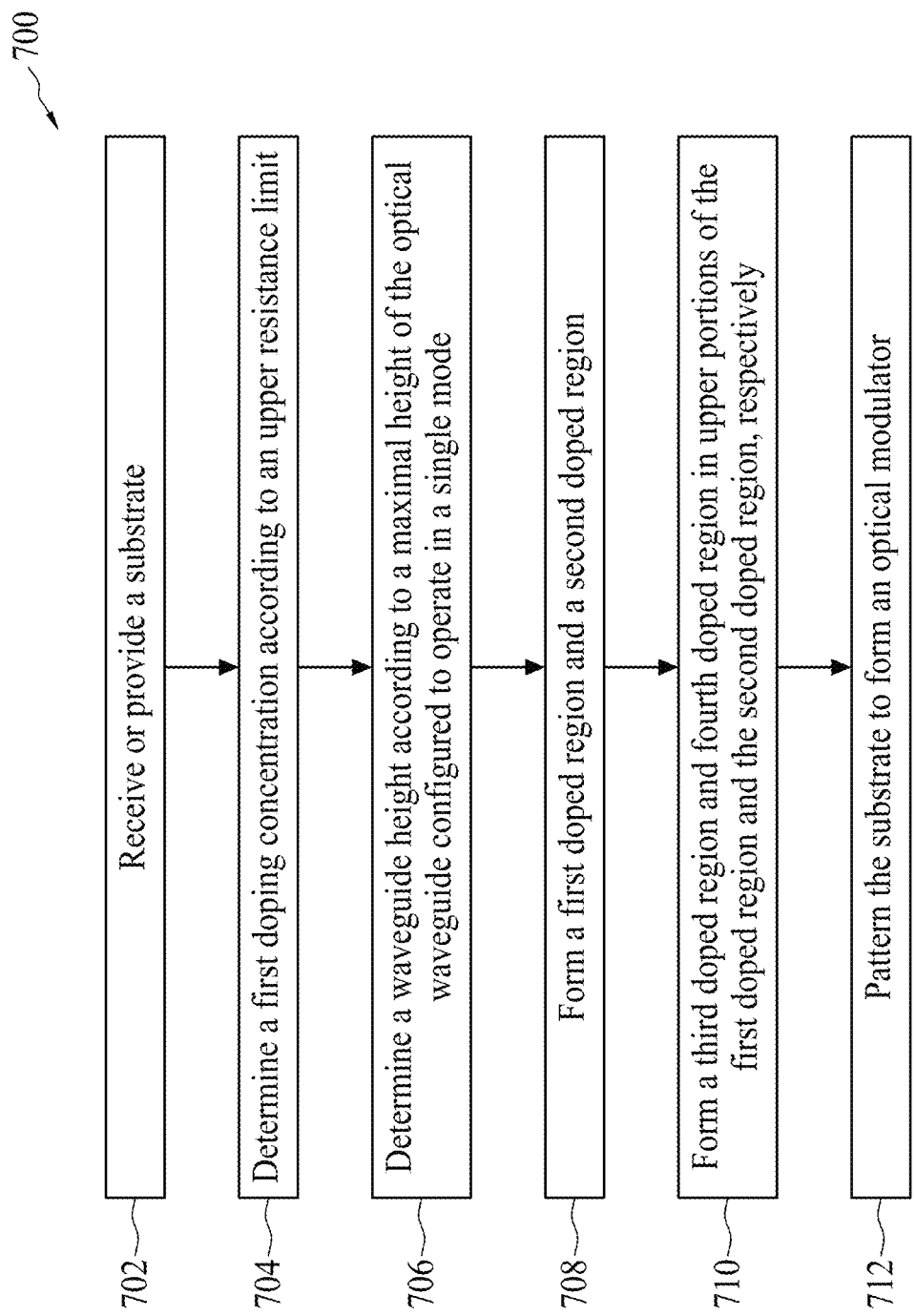
FIG. 7 is a flowchart of a method of manufacturing a photonic device, in accordance with some embodiments of the present disclosure.

FIG. 7 is a flowchart of a method 700 of manufacturing a photonic device, according to aspects of one or more embodiments of the present disclosure. It shall be understood that additional steps can be provided before, during, and after the steps shown in FIG. 7, and some of the steps described below can be replaced with other embodiments or eliminated. The order of the steps may be interchangeable. Some of the steps may be performed concurrently or independently.

At step 702, a substrate is received or provided. In some embodiments, the substrate is a silicon substrate. At step 704, a first doping concentration is determined according to an upper conduction resistance limit of a diode serving as the phase-modulating diode. The upper conduction resistance limit is the upper bound below which the phase change can be monotonically increasing or decreasing during the phase modulation operation by the phase modulator.

At step 706, a waveguide height is determined according to a maximal height of the optical waveguide configured to operate in a single mode. At step 708, a first doped region and a second doped region are formed in the substrate.

At step 710, a third doped region and fourth doped region are formed in upper portions of the first doped region and the second doped region, respectively.

At step 712, the substrate is patterned to form an optical modulator. In some embodiments, the optical modulator is a phase modulator. The phase modulator is formed to include the waveguide and the diode, where the diode is configured to conduct current to traverse the waveguide and change the phase of a light beam propagating in the waveguide.

In accordance with some embodiments of the present disclosure, a method is provided. The method includes receiving a silicon substrate; forming a first doped region and a second doped region in the silicon substrate and laterally spaced by a distance; forming a third doped region and fourth doped region on upper portions of the first doped region and the second doped region, respectively; and patterning the silicon substrate to form an optical modulator. The optical modulator includes: a first section configured to allow an optical signal to propagate; a second section and a third section at least formed from the first and second doped regions, respectively, and configured to receive a modulating signal; a fourth section, including a first height less than that of the first section and the second section and arranged between the first section and the second section, the fourth section being an undoped region; and a fifth section immediately adjacent to the fourth section, the fifth section including a height less than that of the first section and the second section and different from the first height, the fifth section arranged between the first section and the second section and formed from the first doped region.

In accordance with some embodiments of the present disclosure, a method is provided. The method includes receiving a silicon substrate including a first area and a second area configured for an optical waveguide and a diode, respectively, of an optical modulator; determining a first doping concentration according to an upper resistance limit of the diode; determining a waveguide height according to a maximal height of the optical waveguide configured to operate in a single mode; performing a first ion implantation operation to form a first doped region and a second doped region within the second area with the first doping concentration; and patterning the first area and the second area to thereby form a first mesa, a second mesa and a third mesa separate from each other. The first mesa is configured as at least part of the waveguide with the waveguide height, and the second mesa and the third mesa are arranged on two sides of the first mesa and configured as poles of the diode. The diode comprises a channel region including the first doped region and the second doped region, and the channel region further includes an undoped region connecting the first and second doped regions. The first mesa protrudes from the undoped region. The first doped region and the second doped region have different cross section areas, measured along a direction perpendicular to a direction in which a modulating signal flows, than a cross section area of the undoped region.

In accordance with some embodiments of the present disclosure, a photonic device includes: a first optical waveguide and a second optical waveguide on a silicon substrate and connected on two ends of the first and second optical waveguides; and a first diode coupled to the first optical waveguide, the first diode configured to modulate a first optical signal in response to a modulating signal provided by the first diode, the first diode formed of a first doped region, a second doped region and an undoped region on the silicon substrate. The undoped region is between the first and second doped regions, and at least one of the first and second optical waveguide includes the undoped region from a top-view perspective. At least one of the first diode and the first optical waveguide comprises at least three levels of different heights from a cross-sectional view.

The foregoing outlines structures of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
 receiving a silicon substrate;
 forming a first doped region and a second doped region in the silicon substrate and laterally spaced by a distance;
 forming a third doped region and a fourth doped region on upper portions of the first doped region and the second doped region, respectively, wherein the first doped region or and the second doped region has a first doping concentration between about 5E18 atoms/cm$^3$ and about 5E19 atoms/cm$^3$; and
 patterning the silicon substrate to form an optical modulator, the optical modulator comprising:
  a first section configured to allow an optical signal to propagate;
  a second section and a third section at least formed from the first and second doped regions, respectively, and configured to receive a modulating signal;
  a fourth section, including a first height less than that of the first section and the second section and arranged between the first section and the second section, the fourth section being an undoped region; and
  a fifth section immediately adjacent to the fourth section, the fifth section including a height less than that of the first section and the second section and different from the first height, the fifth section arranged between the first section and the second section and formed from the first doped region.

2. The method of claim 1, wherein the forming of the third doped region or the fourth doped region comprises using an ion implantation operation.

3. The method of claim 1, wherein the third doped region or the fourth doped region has a second doping concentration greater than the first doping concentration.

4. The method of claim 3, wherein the second doping concentration is between about 1E20 atoms/cm$^3$ and about 1E22 atoms/cm$^3$.

5. The method of claim 1, wherein the first section is undoped.

6. The method of claim 1, wherein the first section is spaced apart from the second section by a first distance, and a width of the fourth section is in a range between about ½ and about ⅓ of the first distance.

7. The method of claim 1, wherein the fourth section has an upper surface higher than the fifth section.

8. The method of claim 1, wherein the first doped region and the second doped region are a P-type doped region and an N-type doped region, respectively.

9. The method of claim 1, wherein the first doped region and the second doped region comprises a doping concentration that causes a phase change monotonically along with an increase or a decrease of the modulating signal.

10. The method of claim 1, wherein a boundary of the first doped region or the second doped region is separated from a profile of an optical mode of the optical signal.

11. A method, comprising:
receiving a silicon substrate;
forming a first doped region and a second doped region in the silicon substrate and laterally spaced by a distance;
performing a first ion implantation operation to form a third doped region and a fourth doped region on upper portions of the first doped region and the second doped region, respectively, wherein the third or fourth doped region has a first doping concentration greater than a second doping concentration of the first or second doped region; and
patterning the silicon substrate to form an optical modulator, the optical modulator comprising:
a first section configured to allow an optical signal to propagate;
a second section and a third section at least formed from the first and second doped regions, respectively, and configured to receive a modulating signal;
a fourth section, including a first height less than that of the first section and the second section and arranged between the first section and the second section, the fourth section being an undoped region, wherein the fourth section is undoped; and
a fifth section immediately adjacent to the fourth section, the fifth section including a height less than that of the first section and the second section and different from the first height, the fifth section arranged between the first section and the second section and formed from the first doped region.

12. The method of claim 11, wherein the third doped region and the fourth doped region are implanted on surfaces of the first doped region and the second doped region, respectively, prior to patterning the silicon substrate.

13. The method of claim 11, wherein the forming of the first doped region and the second doped region comprises performing a second ion implantation operation on the silicon substrate.

14. The method of claim 11, wherein the second doping concentration between about 5E17 atoms/cm$^3$ and about 1E20 atoms/cm$^3$.

15. The method of claim 11, wherein each of the second and third section has a cross-sectional area greater than the fourth section measured along a plane perpendicular to a direction in which the modulating signal flows.

16. The method of claim 11, wherein the fifth section has an upper surface higher than the fourth section.

17. A method, comprising:
receiving a silicon substrate;
forming a first doped region and a second doped region in the silicon substrate and laterally spaced by a distance;
forming a third doped region and a fourth doped region on upper portions of the first doped region and the second doped region, respectively, wherein the third or fourth doped region has a first doping concentration greater than a second doping concentration of the first or second doped region; and
patterning the silicon substrate to form a first phase modulator, the first phase modulator comprising:
a first section configured to allow a first optical signal to propagate;
a second section and a third section at least formed from the first and second doped regions, respectively, and configured to receive a first modulating signal;
a fourth section, including a first height less than that of the first section and the second section and arranged between the first section and the second section, the fourth section including an undoped region; and
a fifth section immediately adjacent to the fourth section, the fifth section including a height less than that of the first section and the second section and different from the first height, the fifth section arranged between the first section and the second section and formed from the first doped region.

18. The method of claim 17, further comprising patterning the silicon substrate to form a second phase modulator, the second phase modulator comprising:
an optical waveguide configured to allow a second optical signal to propagate; and
a diode configured to direct a second modulating signal to modulate the second optical signal, the diode including a first section and a second section on two sides of the optical waveguide, wherein the optical waveguide includes a stepped shape.

19. The method of claim 18, wherein the first phase modulator and the second phase modulator constitute an optical modulator.

20. The method of claim 17, wherein the fourth section and the fifth section have different heights.

* * * * *